United States Patent [19]

Inaba et al.

[11] Patent Number: 5,670,028
[45] Date of Patent: Sep. 23, 1997

[54] PROCESS FOR PREPARING HIGH PURITY HYDROGEN PEROXIDE AQUEOUS SOLUTION

[75] Inventors: Yukio Inaba; Yohsuke Ueno; Masahiko Watanabe; Yukihiro Nishida, all of Ube, Japan

[73] Assignee: Ube Industries, Ltd., Yamaguchi-ken, Japan

[21] Appl. No.: 558,724

[22] Filed: Nov. 16, 1995

[30] Foreign Application Priority Data

Nov. 22, 1994 [JP] Japan .................. 6-288155

[51] Int. Cl.$^6$ .................. B01D 3/00; B01D 3/34
[52] U.S. Cl. .................. 203/86; 203/96; 203/99; 203/DIG. 19; 202/267.1; 159/DIG. 15; 423/584
[58] Field of Search ........... 202/267.1; 159/DIG. 15; 203/86, 95, 96, 99, DIG. 19; 423/584

[56] References Cited

U.S. PATENT DOCUMENTS

| | | | |
|---|---|---|---|
| 3,617,219 | 11/1971 | Cook, Jr. .................. | 203/96 |
| 3,765,932 | 10/1973 | Kukubo et al. .................. | 524/296 |
| 5,055,286 | 10/1991 | Watanabe et al. .................. | 423/584 |
| 5,232,680 | 8/1993 | Honig et al. .................. | 423/584 |
| 5,296,104 | 3/1994 | Signorini et al. .................. | 203/83 |
| 5,456,898 | 10/1995 | Shimokawa et al. .................. | 423/584 |

FOREIGN PATENT DOCUMENTS 5-201707  8/1993  Japan.

*Primary Examiner*—Nina Bhat
*Attorney, Agent, or Firm*—Frishauf, Holtz, Goodman, Langer & Chick, P.C.

[57] ABSTRACT

A process for preparing a high purity $H_2O_2$ aqueous solution, which comprises the steps of: (a) feeding a crude $H_2O_2$ aqueous solution containing $H_2O_2$, organic carbon impurities and inorganic impurities into a distillation column having an inner wall at least the surface of which is made of a fluorine resin and internals and packings at least the surface of which are made of a fluorine resin being provided internally of the distillation column, from a bottom portion of the distillation column; (b) subjecting the crude hydrogen peroxide aqueous solution to distillation under reduced pressure and under heating the bottom portion; (c) taking out a distillate containing an extremely low concentration of $H_2O_2$ from a top portion of the distillation column without using the distillate for reflux in a distillation operation, and feeding ultra pure water in an amount satisfying (an amount of ultra pure water fed into column top)/((an amount of column top distillate)—(an amount of ultra pure water fed into column top)) being 0.1 to 20 into the top portion of the distillation column; and (d) taking out a $H_2O_2$ aqueous solution having a high purity from a middle portion of the distillation column, simultaneously or successively.

9 Claims, 1 Drawing Sheet

PROCESS FOR PREPARING HIGH PURITY HYDROGEN PEROXIDE AQUEOUS SOLUTION

BACKGROUND OF THE INVENTION

This invention relates to a process for preparing a hydrogen peroxide aqueous solution having an extremely high purity industrially and easily. The hydrogen peroxide aqueous solution having an extremely high purity has been used in the field of the precision electronic industry, particularly for preparing a highly integrated semiconductor substrate. In recent years, a demand for said solution has been increased.

A hydrogen peroxide aqueous solution has been prepared industrially by a method of producing hydrogen peroxide by using alkylanthraquinone as an actuating liquid circulating in a process; hydrogenating the quinone compound to obtain a hydroquinone compound; and oxidizing the hydroquinone compound again into a quinone compound by using air. However, the hydrogen peroxide aqueous solution (which is a crude hydrogen peroxide aqueous solution) obtained by the above known method contains a large amount of impurities such as organic impurities and inorganic impurities.

Therefore, it has been proposed to purify the crude hydrogen peroxide aqueous solution prepared by the above method by, for example, a method of removing impurities by using a distillation column having a vapor phase-washing band area where a vapor phase formed by distilling a crude hydrogen peroxide aqueous solution is washed at a bottom portion of the column (see Japanese Provisional Patent Publication No. 201707/1993). However, the resulting hydrogen peroxide aqueous solution contains less than 300 ppm and exceeding 50 ppm of organic impurities represented by total organic carbon (TOC) and about 30 to 200 ppm of inorganic impurities, whereby the above solution is not suitable in the field of the precision electronic industry, particularly for preparing a highly integrated semiconductor substrate.

As described above, there has not been known a process for preparing a hydrogen peroxide aqueous solution, by which a hydrogen peroxide aqueous solution having an extremely high purity which can be used in the field of the precision electronic industry, particularly for preparing a highly integrated semiconductor substrate can be prepared easily by distillation from an industrially prepared crude hydrogen peroxide aqueous solution.

SUMMARY OF THE INVENTION

An object of the present invention is to provide a industrially suitable process for preparing a high purity hydrogen peroxide aqueous solution, by which an aqueous solution containing an extremely less amount of impurities and a high concentration of hydrogen peroxide which can be used in the field of the precision electronic industry, particularly for preparing a highly integrated semiconductor substrate, i.e., a hydrogen peroxide aqueous solution having a high purity and a high concentration can be obtained easily.

The above object of the present invention can be achieved by a process for preparing a high purity hydrogen peroxide aqueous solution, which comprises the steps of:

feeding a crude hydrogen peroxide aqueous solution containing hydrogen peroxide, organic impurities and inorganic impurities into a distillation column having an inner wall at least the surface of which is made of a fluorine resin and almost all internals and packings at least the surface of which are made of a fluorine resin being provided internally of the distillation column, from a bottom portion of the distillation column;

reducing pressure in the distillation column and heating the crude hydrogen peroxide aqueous solution at the bottom portion of the distillation column to effect distillation of the crude hydrogen peroxide aqueous solution under reduced pressure;

while effecting the distillation, taking out a distillate from a top portion of the distillation column without using the distillate for reflux in a distillation operation, and feeding ultra pure water in an amount satisfying (an amount of ultra pure water fed into column top)/((an amount of column top distillate)—(an amount of ultra pure water fed into column top)) being 0.1 to 20 from the top portion of the distillation column; and while taking out the distillate and feeding the ultra pure water, taking out a hydrogen peroxide aqueous solution having a high purity from a middle portion of the distillation column, simultaneously or successively to obtain a high purity hydrogen peroxide aqueous solution.

DESCRIPTION OF THE PREFERRED EMBODIMENTS

Figure 1:
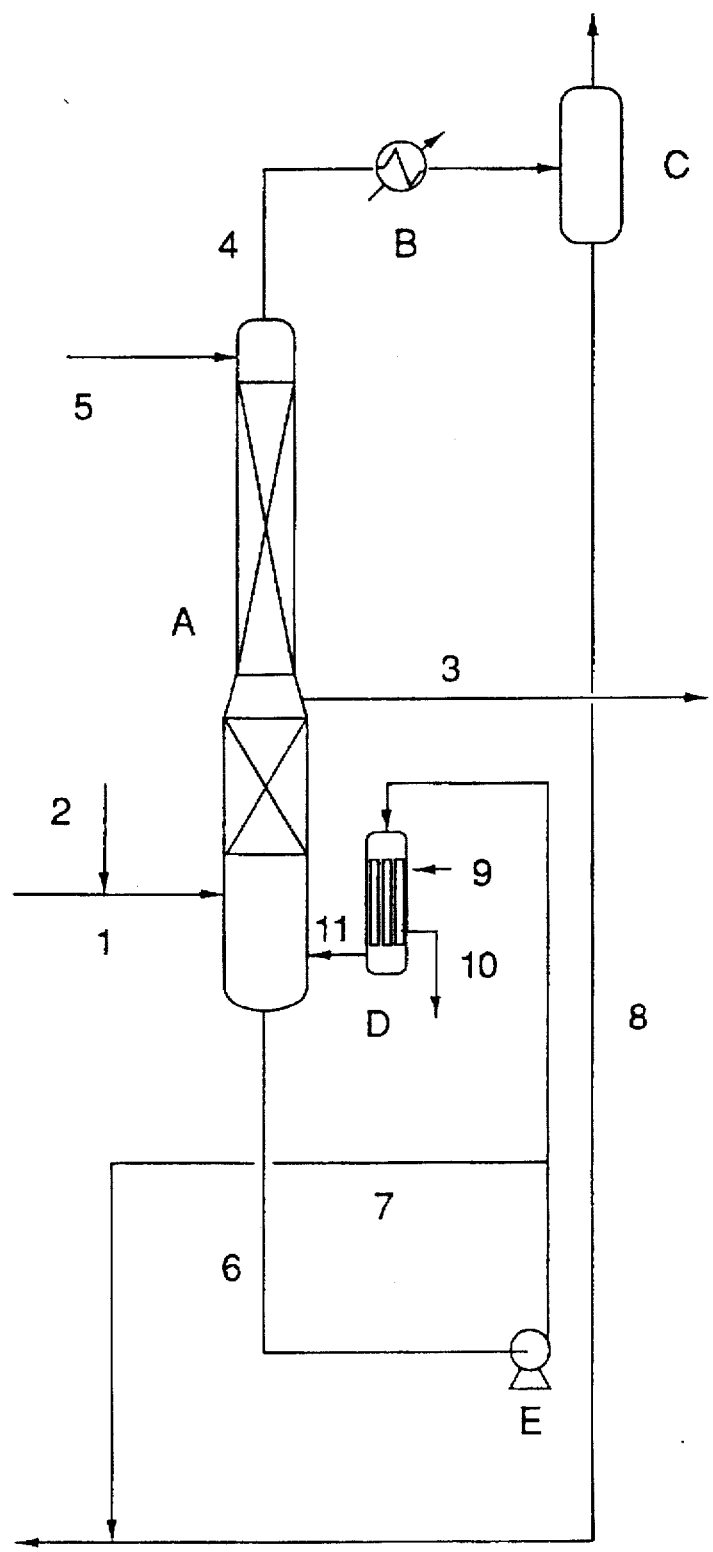
FIG. 1 is a flow chart showing one embodiment of the present invention.

In the following, the present invention is explained in detail.

The crude hydrogen peroxide aqueous solution is not particularly limited, and there may be used, for example, a crude hydrogen peroxide aqueous solution prepared by a method of using alkylanthraquinone as an actuating liquid circulating in a process, an electrolysis method accompanied with hydrolysis of persulfuric acid or persulfate or a method of directly oxidizing hydrogen by oxygen. The concentration of hydrogen peroxide contained in the crude hydrogen peroxide aqueous solution prepared by the above methods is not particularly limited. A hydrogen peroxide aqueous solution for general industrial use in which the concentration of hydrogen peroxide is 50 to 70% by weight, particularly 55to 65% by weight is suitably used as the crude hydrogen peroxide aqueous solution of the present invention. As impurities contained in the hydrogen peroxide aqueous solution for industrial use, there may be mentioned, for example, those shown in Table 1 below.

TABLE 1

| Item | | Unit | Analyzed value |
|---|---|---|---|
| Organic impurities | Total organic carbon (TOC) | ppm | 40 |
| Inorganic impurities | $Cl^-$ | ppb | <1,000 |
| | $NO_2^-$ | ppb | <1,000 |
| | $NO_3^-$ | ppb | 33,000 |
| | $PO_4^{3-}$ | ppb | 36,000 |
| | $SO_4^{2-}$ | ppb | 1,000 |
| | $NO_4^+$ | ppb | 6,000 |
| | Al | ppb | 120 |
| | B | ppb | <1 |
| | Ca | ppb | 210 |
| | Fe | ppb | 2 |
| | Mg | ppb | 2 |
| | Na | ppb | 20,000 |
| | Si | ppb | 95 |
| | Zn | ppb | 3 |

As ultra pure water, there may be used, for example, ultra pure water prepared by a ultra pure water-preparing apparatus equipped with a reverse osmosis device, a UV sterilization device, an ion exchange column and an ultrafiltration membrane as a unit. The quality of ultra pure water is, for example, as shown in Table 2.

TABLE 2

| Item | Analyzed value |
| --- | --- |
| Specific resistance | 18 MΩ · cm |
| Total organic carbon (TOC) | 30 ppb or less |
| Fine particle | 0.1 μm or more: 10 or less particles/ml |
| Living bacterium | 1 or less bacterium/100 ml |

As the distillation column, a packed column having an inner wall at least the surface of which is made of a fluorine resin is preferably used. In the case where the inner wall of the distillation column is made of a stainless steel, iron, nickel, chromium and the like are dissolved out; in the case where said wall is made of aluminum, aluminum is dissolved out; and in the case where said wall is subjected to glass lining, silicon, boron, sodium and the like are dissolved out, whereby impurities contained in the crude hydrogen peroxide aqueous solution are increased in the respective cases. The inner wall made of a fluorine resin of the distillation column may be either an inner wall entirely subjected to lining or coated with a fluorine resin, or an inner wall with a portion above a port from which the crude hydrogen peroxide aqueous solution is fed, being subjected to lining or coated with a fluorine resin, and further, a distillation column itself made of a fluorine resin may be used.

As the internals and packings (i.e., fractionating member) at least the surface of which are made of a fluorine resin to be packed in the distillation column (the packed column), there may be mentioned a packing material, a perforated plate tray, a bubble tray and a bubble cap tray, but a packing material made of a fluorine resin is preferably used. The shape of the packing material is not particularly limited, and there may be used, for example, a Raschig ring, an Intalox saddle and a Pall ring. In order to take out a distillate containing an extremely low concentration of hydrogen peroxide from a top portion of the distillation column, two numbers of theoretical plates or more of the fractionating members are generally packed at a portion above a hydrogen peroxide aqueous solution-taking out port provided at a middle portion of the distillation column, and in order to prevent contamination of impurities caused by entrainment from the solution at the bottom of the distillation column as described below, one number of theoretical plate or less of the fractionating members is generally packed also at a lower portion of the hydrogen peroxide aqueous solution-taking out port from said port.

As the fluorine resin to be used at the inner wall of the distillation column and the fractionating member, there may be mentioned a fluorine resin in which an olefin monomer having at least one hydrogen atom bonding to the carbon atom being replaced by a fluorine atom is polymerized as a constitutional unit. Preferably, those containing, as a constitutional monomer unit, tetrafuluoroethylene, hexafluoropropylene, chlorotrifluoroethylene, vinylidene fluoride, vinyl fluoride, perfluoroalkyl vinyl ether, etc. More specifically, there may be mentioned, for example, polytetrafluoroethylene (PTFE), a tetrafluoroethylene-perfluoroalkyl vinyl ether copolymer (PFA), a tetrafluoroethylene-hexafluoropropylene copolymer (FEP), an ethylenetetrafluoroethylene copolymer (ETFE), polyvinylidene fluoride (PVDF), polychlorotrifluoroethylene (PCTFE) and an ethylene-chlorotrifluoroethylene copolymer (ECTFE). Among them, polytetrafluoroethylene (PTFE) and a tetrafluoroethylene-perfluoroalkyl vinyl ether copolymer (PFA) are preferred.

In order to practice the process of the present invention industrially and efficiently, it is preferred to adopt the following means.

That is, as to the shape of the distillation column, it is preferred in common design of the distillation column that the optimum column diameter of the distillation column at the portion below the hydrogen peroxide aqueous solution-taking out port is made large, and said diameter at the portion above the port is made smaller than the diameter at the portion below the port. This is because the amount of a rising gas at the portion below the hydrogen peroxide aqueous solution-taking out port is large, and the amount of the gas at the portion above the port is smaller than that at the portion below the port. The above column diameter can be easily calculated by a conventional chemical engineering means.

In the distillation column, a reboiler is provided. In the process of the present invention, entrainment from the solution at the bottom of the distillation column causes a problem so that it is preferred to provide a falling film type reboiler, particularly a vapor-liquid parallel flow type-falling film type reboiler among various types of reboilers.

In the present invention, in the step of distilling the crude hydrogen peroxide aqueous solution, the above crude hydrogen peroxide aqueous solution containing hydrogen peroxide, organic impurities and inorganic impurities is generally diluted with the above ultra pure water and then fed into the bottom portion of the above distillation column from a crude hydrogen peroxide aqueous solution-feeding port. The diluting degree of the crude hydrogen peroxide aqueous solution is not particularly limited. In order to obtain an aqueous solution containing an extremely low concentration of impurities and a high concentration of hydrogen peroxide, i.e., a hydrogen peroxide aqueous solution having a high purity and a high concentration, the crude hydrogen peroxide aqueous solution is generally diluted so that the concentration of hydrogen peroxide is 20 to 60% by weight, preferably 30 to 50% by weight, more preferably about 35 to 45% by weight. In the diluted crude hydrogen peroxide aqueous solution, 10 to 300 ppm of total organic carbon and 5 to 500 ppm of inorganic impurities are generally contained, whereas the amount of impurities contained in the diluted hydrogen peroxide aqueous solution is not constant and varies depending on the preparation process or preparation apparatus of the crude hydrogen peroxide aqueous solution or the like.

The distillation described above is effected generally by feeding the crude hydrogen peroxide aqueous solution diluted as described above to the bottom portion of the above distillation column from the crude hydrogen peroxide aqueous solution-feeding port; using conditions of a column bottom temperature of 50° to 110° C., preferably 60° to 70° C. and a column top pressure of 20 to 300 Torr, preferably 40 to 60 Torr; and taking out a distillate (a column top distillate) containing an extremely low concentration of hydrogen peroxide from the top portion of the above distillation column without using the distillate for reflux in the distillation operation; and feeding ultra pure water in an amount that the formula of the feeding ratio satisfies 0.1 to 20. That is, the amount of ultra pure water to be fed into the column top portion (ultra pure water fed into the column top) is an amount satisfying a feeding ratio represented by the following formula of 0.1 to 20, preferably 0.5 to 3.

$$\text{Feeding ratio} = \frac{\text{Amount of ultra pure water fed into column top}}{\text{Amount of column top distillate} - \text{Amount of ultra pure water fed into column top}}$$

The hydrogen peroxide aqueous solution containing an extremely low concentration of impurities and thus having a high purity is separated by being taken out from the hydrogen peroxide aqueous solution-taking out port provided at the middle portion of the distillation column as a high purity hydrogen peroxide aqueous solution.

In the present specification, the high purity hydrogen peroxide aqueous solution means a hydrogen peroxide aqueous solution containing 10 ppm or less, preferably 5 ppm or less of the total organic carbon; 200 ppb or less, preferably 100 ppb or less of total inorganic impurities; and 1 ppb or less, preferably 0.5 ppb or less of respective metal impurities such as Al, B, Ca, Fe, Mg, Na, Si and Zn.

Here, it is preferred to provide the hydrogen peroxide aqueous solution-taking out port at a portion closer to the bottom of the column among the middle portion of the distillation column in consideration of such a point of product quality that a hydrogen peroxide aqueous solution containing a high concentration of hydrogen peroxide (e.g., 25 to 50% by weight, particularly 30 to 40% by weight) and an extremely low concentration of impurities as shown above should be obtained; such a point of safety that the concentration of hydrogen peroxide in the solution at the bottom of the column should be maintained at 74 to 80% by weight; and the point of vapor-liquid equilibrium. Therefore, the hydrogen peroxide aqueous solution-taking out port is generally provided so that one number of theoretical plate of less of the above fractionating members can be packed between the taking out port and the bottom of the column. At the bottom portion of the column, although impurities are concentrated to have high concentrations, contamination of impurities caused by entrainment from the solution at the bottom of the column can be reduced by the packing material.

From the top of the distillation column, the column top distillate (an aqueous solution containing 0.001 to 2% by weight, preferably 0.01 to 1% by weight of hydrogen peroxide) is taken out. At the time of taking out the column top distillate, in order to prevent contamination in the distillation column caused by dissolution of materials of devices such as a condenser, a reflux drum and a reflux line and/or leakage of outside air, in the present invention, there are carried out operations of interrupting reflux carried out in the distillation operation, distilling out almost all of the column top distillate and feeding ultra pure water in an amount satisfying the above feeding ratio of 0.1 to 20 into the column top portion. By these operations, not only contamination in the distillation column can be prevented, but also an inexpensive condenser and an inexpensive reflux drum both of which are made of a stainless steel can be used in place an expensive condenser and an expensive reflux drum both of which are subjected to lining with a fluorine resin, and also the overall heat transfer coefficient of a heat exchanger made of a stainless steel is higher by 2.8 to 3 times than that of a heat exchanger subjected to lining with a fluorine resin so that the size of a heat exchanger can be greatly minimized, whereby the process of the present invention is extremely advantageous.

The concentration of hydrogen peroxide in the solution at the bottom of the column taken out from the bottom portion of the distillation column is required to be 74% by weight or more from the point of vapor-liquid equilibrium as described above, but it is generally maintained in the range of 74 to 80 % by weight from the point of safety. A part of the solution at the bottom of the column is circulated into the distillation column. A part of the solution at the bottom of the column is diluted by the above column top distillate so that the concentration of hydrogen peroxide is about 60% by weight, and the resulting diluted solution is used again as a hydrogen peroxide aqueous solution for industrial use.

The process of the present invention can be carried out by either a continuous system or a batch system, but a continuous system is preferred industrially. When the distillation is carried out by the continuous system, (a) the total amount of an amount of the crude hydrogen peroxide solution to be fed to the bottom portion of the column and an amount of the ultra pure water to be fed to the top portion of the column and (b) the total amount of (an amount of the column bottom solution taken out from the bottom of the column, an amount of the column top distillate taken out from the top of the column and an amount of the hydrogen peroxide aqueous solution taken out from the middle of the column) are balanced whereby the amount of the solution in the column does not substantially change.

In the following, the process of the present invention is described in detail by referring to a flow sheet drawing (FIG. 1) showing one embodiment of the present invention.

Into a bottom portion of a distillation column A subjected to lining with a fluorine resin and packed with a packing material made of a fluorine resin, a crude hydrogen peroxide aqueous solution diluted with ultra pure water introduced by a conduit 2 is fed through a conduit 1 from a crude hydrogen peroxide aqueous solution-feeding port. By distilling the crude hydrogen peroxide aqueous solution under the conditions as described above, a high purity hydrogen peroxide aqueous solution containing, for example, 31% by weight of hydrogen peroxide is taken out from a taking out port at the middle of the distillation column through a conduit 3. At that time, from a column top portion, a column top distillate is taken out from a column top distillate-taking out port through a conduit 4, and ultra pure water is fed with an amount satisfying the above feeing ratio being 0.1 to 20 into the column top portion through a conduit 5 from a ultra pure water-feeding port. In the distillation column A, the crude hydrogen peroxide aqueous solution-feeding port is an opening of the conduit 1; the hydrogen peroxide aqueous solution-taking out port is an opening of the conduit 3; the column top distillate-taking out port is an opening of the conduit 4; and the ultra pure water-feeding port is an opening of the conduit 5.

The solution at the bottom of the column in which impurities are concentrated (a hydrogen peroxide aqueous solution with a high concentration) of the distillation column is taken out through a conduit 6. A part of the taken-out solution at the bottom of the column is fed by circulation into the bottom portion of the distillation column through a falling membrane type reboiler D and a conduit 11 by a pump E provided on the conduit 6. A part of the solution at the bottom of the column is taken out through a conduit 7, passed through the conduit 4, a condenser B and a reflux drum C and mixed with the above column top distillate fed from a conduit 8 to be used again as a hydrogen peroxide aqueous solution for industrial use containing 60% by weight of hydrogen peroxide. In the reboiler D, for the purpose of distilling the solution at the bottom of the column (the hydrogen peroxide aqueous solution having a high concentration) fed through the conduit 6, heat exchange is effected by feeding steam from a conduit 9, and condensed water is discharged from a conduit 10.

As described above, from a crude hydrogen peroxide aqueous solution containing a large amount of organic impurities and inorganic impurities, an aqueous solution containing an extremely low concentration of impurities and a high concentration of hydrogen peroxide which can be used for preparing a highly integrated semiconductor substrate, i.e., a hydrogen peroxide aqueous solution having a high purity and a high concentration can be obtained easily.

EXAMPLES

In the following, the present invention is explained in detail by referring to Examples which use the device shown in FIG. 1.

Hydrogen peroxide and other components were analyzed by the following methods, respectively.

(1) Amount of hydrogen peroxide: titration using a potassium permanganate normal solution (JIS K-8230)

(2) Total organic carbon (TOC): a method in which hydrogen peroxide is decomposed by platinum and then TOC is measured by a TOC meter (3) Chloride ion ($Cl^-$), nitrous acid ion ($NO_2^-$), nitric acid ion ($NO_3^-$), phosphoric acid ion ($PO_4^{3-}$) and sulfuric acid ion ($SO_4^{2-}$): a method in which hydrogen peroxide is decomposed by platinum and then the respective ions are measured by a suppressor type ion chromatographic analyzer (4) Ammonium ion ($NH_4^+$): a method in which hydrogen peroxide is decomposed by platinum and then an ammonium ion is measured by a ion chromatographic analyzer (5) Aluminum (Al), boron (B), calcium (Ca), iron (Fe), magnesium (Mg), sodium (Na), silicon (Si), zinc (Zn): ICP (high frequency induction combined plasma) emission spectral analysis

EXAMPLE 1

A hydrogen peroxide aqueous solution for industrial use containing 60% by weight of hydrogen peroxide and having the quality shown in the above Table 1 was diluted with ultra pure water having the quality shown in the above Table 2 which was fed from a conduit 2 to prepare a crude hydrogen peroxide aqueous solution containing 40% by weight of hydrogen peroxide. The crude hydrogen peroxide aqueous solution was fed into a distillation column which was made of fluorine resin, had an inner diameter of 30 mm$\phi$ and a height of 1.0 m and packed with packing materials each made of a fluorine resin and having an outer diameter of 6.0 mm$\phi$, an inner diameter of 4.0 mm$\phi$ and a height of 6.0 mm in an amount of 180 ml, at a rate of 387.7 g/hr through a conduit 1. As the fluorine resin, polytetrafluoroethylene (PTFE) was used in both of the distillation column and the packing material.

At a column solution temperature of 69° C. and under a column top pressure of 60 Torr, all of a column top distillate was distilled out from a conduit 4 at a rate of 112 ml/hr without reflux. In place of effecting reflux, distillation was effected while ultra pure water having the quality shown in the above Table 2 was fed from a column top portion through a conduit 5 at a rate of 58 ml/hr, and a hydrogen peroxide aqueous solution was taken out from a middle portion of the distillation column at a rate of 375 ml/hr. The resulting hydrogen peroxide aqueous solution was analyzed to find that said solution was an aqueous solution containing an extremely low con- centration of hydrogen peroxide which could be used for preparing a highly integrated semiconductor substrate, i.e., a hydrogen peroxide aqueous solution having a high purity and a high concentration (31.0% by weight) as shown in Table 3.

A solution at the bottom of the column was taken out from a conduit 7 at a rate of 153 ml/hr. The solution at the bottom of the column was mixed with a part of the above column top distillate by feeding said distillate from a conduit 8 at a rate of 40 ml/hr to obtain a hydrogen peroxide aqueous solution for industrial use containing 60% by weight of hydrogen peroxide at a rate of 193 ml/hr.

EXAMPLE 2

Distillation was effected in the same manner as in Example 1 and a hydrogen peroxide aqueous solution was taken out from the middle portion of the distillation column except for changing the column solution temperature from 69° C. to 63° C. and the column top pressure from 60 Torr to 40 Torr. The resulting hydrogen peroxide aqueous solution was analyzed to find that said solution was an aqueous solution containing an extremely low concentration of impurities and a high concentration of hydrogen peroxide which could be used for preparing a highly integrated semiconductor substrate, i.e., a hydrogen peroxide aqueous solution having a high purity and a high concentration (31.0% by weight) as shown in Table 3.

TABLE 3

| | Item | Unit | Example 1 | Example 2 |
|---|---|---|---|---|
| Organic impurities | Total organic carbon (TOC) | ppm | 5.0 | 3.4 |
| Inorganic impurities | $Cl^-$ | ppb | <5 | <5 |
| | $NO_2^-$ | ppb | <5 | <5 |
| | $NO_3^-$ | ppb | 75 | 15 |
| | $PO_4^{3-}$ | ppb | <5 | <5 |
| | $SO_4^{2-}$ | ppb | 20 | 40 |
| | $NH_4^+$ | ppb | <5 | <5 |
| | Al | ppb | <0.1 | 0.4 |
| | B | ppb | <0.1 | <0.1 |
| | Ca | ppb | <0.1 | <0.1 |
| | Fe | ppb | <0.1 | 0.1 |
| | Mg | ppb | <0.1 | <0.1 |
| | Na | ppb | <0.1 | 0.4 |
| | Si | ppb | <0.1 | 0.4 |
| | Zn | ppb | <0.1 | <0.1 |

Comparative example 1

Distillation was effected in the same manner as in Example 1 and a hydrogen peroxide aqueous solution was taken out from the middle portion of the distillation column at a rate of 375 ml/hr except for refluxing the column top distillate at a reflux ratio of 1 without taking out all of the distillate nor feeding ultra pure water. The resulting hydrogen peroxide aqueous solution was analyzed to find that said solution contained a high concentration of impurities and was not suitable for preparing a highly integrated semiconductor substrate as shown in Table 4.

Comparative example 2

Distillation was effected in the same manner as in Example 1 and a hydrogen peroxide aqueous solution was taken out from the middle portion of the distillation column at a rate of 375 ml/hr except for using a distillation column made of glass (pyrex) and having an inner diameter of 30 mm$\phi$ and a height of 1 m in place of the distillation column made of a fluorine resin. The resulting hydrogen peroxide aqueous solution was analyzed to find that said solution contained a high concentration of impurities and was not suitable for preparing a highly integrated semiconductor substrate as shown in Table 4.

Comparative Example 3

Distillation was effected in the same manner as in Example 1 and a hydrogen peroxide aqueous solution was taken out from the middle portion of the distillation column at a rate of 375 ml/hr except for using a packing material made of glass (pyrex) in place of the packing material made of a fluorine resin. The resulting hydrogen peroxide aqueous solution was analyzed to find that said solution contained a high concentration of impurities and was not suitable for preparing a highly integrated semiconductor substrate as shown in Table 4.

TABLE 4

| | Item | Unit | Comparative example 1 | Comparative example 2 | Comparative example 3 |
|---|---|---|---|---|---|
| Organic impurities | Total organic carbon (TOC) | ppm | 4.3 | 9.0 | 9.0 |
| Inorganic impurities | $Cl^-$ | ppb | <5 | <5 | <5 |
| | $NO_2^-$ | ppb | <5 | <50 | <10 |
| | $NO_3^-$ | ppb | 255 | <100 | 10 |
| | $PO_4^{3-}$ | ppb | <5 | <50 | 20 |
| | $SO_4^{2-}$ | ppb | 45 | <50 | 20 |
| | $NH_4^+$ | ppb | <5 | <5 | <5 |
| | Al | ppb | 0.3 | 0.4 | <0.1 |
| | B | ppb | 0.5 | <0.1 | 3.4 |
| | Ca | ppb | 0.3 | 0.6 | 0.8 |
| | Fe | ppb | <0.1 | <0.1 | <0.1 |
| | Mg | ppb | 0.1 | 0.1 | 0.2 |
| | Na | ppb | 1.0 | 1.6 | 0.6 |
| | Si | ppb | 0.6 | 3.2 | 3.9 |
| | Zn | ppb | <0.1 | <0.1 | <0.1 |

From Table 4, it can be found that in Comparative example 1, an amount of $NO_3^-$ is remarkably large and yet amounts of Na and Si exceed 0.5 ppb, respectively. In Comparative example 2, amounts of some metal impurities such as Ca, Na and Si exceed 0.5 ppb and similarly in Comparative example 3, amounts of some metal impurities such as B, Ca, Na and Si exceed 0.5 ppb, respectively.

According to the present invention, from a crude hydrogen peroxide aqueous solution containing a large amount of organic impurities and inorganic impurities, an aqueous solution containing an extremely low concentration of impurities and a high concentration of hydrogen peroxide which can be used in the field of the electronic industry, particularly for preparing a highly integrated semiconductor substrate, i.e., a hydrogen peroxide aqueous solution having a high purity and a high concentration can be prepared easily. Also, according to the present invention, an inexpensive condenser and an inexpensive reflux drum both of which are made of a stainless steel can be used in place an expensive condenser and an expensive reflux drum both of which are subjected to lining with a fluorine resin, and also the overall heat transfer coefficient of a heat exchanger made of a stainless steel is higher by 2.8 to 3 times than that of a heat exchanger subjected to lining with a fluorine resin so that the size of a heat exchanger can be greatly minimized, whereby an industrially and extremely advantageous process for preparing a high purity hydrogen peroxide aqueous solution can be provided.

We claim:

1. A process for preparing a high purity hydrogen peroxide aqueous solution, which comprises the steps of:
   feeding a crude hydrogen peroxide aqueous solution containing hydrogen peroxide, organic carbon impurities and inorganic impurities into a distillation column from a bottom portion of the distillation column, said distillation column having an inner wall at least the surface of which is made of a fluorine resin and almost all internals and packings at least the surface of which are made of a fluorine resin being provided internally of the distillation column;
   subjecting the crude hydrogen peroxide aqueous solution to distillation under reduced pressure and under heating of the bottom portion;
   taking out a distillate from a top portion of the distillation column without using the distillate for reflux in a distillation operation, and feeding ultra pure water in an amount satisfying a feeding ratio represented by the following formula:

$$\text{Feeding ratio} = \frac{\text{Amount of ultra pure water fed into column top}}{\text{Amount of column top distillate} - \text{Amount of ultra pure water fed into column top}}$$

being 0.1 to 20, into the top portion of the distillation column; and
   taking out a high purity hydrogen peroxide aqueous solution from a middle portion of the distillation column, in a batch or continuous process.

2. The process according to claim 1, wherein the internals and packings are packing materials made of a fluorine resin.

3. The process according to claim 1, wherein the crude hydrogen peroxide aqueous solution is an aqueous solution containing 20 to 60% by weight of hydrogen peroxide, 10 to 300 ppm of total organic carbon and 5 to 500 ppm of inorganic impurities.

4. The process according to claim 3, wherein the crude hydrogen peroxide aqueous solution is an aqueous solution containing 30 to 50% by weight of hydrogen peroxide.

5. The process according to claim 1, further comprising recovering low purity hydrogen peroxide by the steps of diluting hydrogen peroxide aqueous solution taken out from the bottom portion of the distillation column with the distillate taken out from the top portion of the distillation column.

6. The process according to claim 1, wherein the high purity hydrogen peroxide aqueous solution contains 10 ppm or less of the total organic carbon; 200 ppb or less of total inorganic impurities; and 1 ppb or less of respective metal impurities including Al, B, Ca, Fe, Mg, Na, Si and Zn.

7. The process according to claim 1, wherein the high purity hydrogen peroxide aqueous solution contains 5 ppm or less of the total organic carbon; 100 ppb or less of total inorganic impurities; and 0.5 ppb or less of respective metal impurities including Al, B, Ca, Fe, Mg, Na, Si and Zn.

8. The process according to claim 1, wherein the fluorine resin is at least one selected from the group consisting of polytetrafluoroethylene, a tetrafluoroethylene-perfluoroalkyl vinyl ether copolymer, a tetrafluoroethylene-hexafluoropropylene copolymer, an ethylene-tetrafluoroethylene copolymer, polyvinylidene fluoride, polychlorotrifluoroethylene and an ethylene-chlorotrifluoroethylene copolymer.

9. The process according to claim 8, wherein the fluorine resin is polytetrafluoroethylene or a tetrafluoroethyleneperfluoroalkyl vinyl ether copolymer.

* * * * *